United States Patent
Lin et al.

(10) Patent No.: US 8,110,111 B1
(45) Date of Patent: Feb. 7, 2012

(54) MEMBRANE CONTACTOR ASSISTED EXTRACTION/REACTION PROCESS EMPLOYING IONIC LIQUIDS

(75) Inventors: Yupo J. Lin, Naperville, IL (US); Seth W. Snyder, Lincolnwood, IL (US)

(73) Assignee: U.S. Department of Energy, Washington, DC (US)

( * ) Notice: Subject to any disclaimer, the term of this patent is extended or adjusted under 35 U.S.C. 154(b) by 255 days.

(21) Appl. No.: 12/633,138

(22) Filed: Dec. 8, 2009

Related U.S. Application Data

(62) Division of application No. 11/536,933, filed on Sep. 29, 2006, now abandoned.

(51) Int. Cl.
*B01D 61/24* (2006.01)
*B01D 11/00* (2006.01)

(52) U.S. Cl. ............. 210/644; 210/648; 210/321.72; 96/5

(58) Field of Classification Search .............. None
See application file for complete search history.

(56) References Cited

U.S. PATENT DOCUMENTS

| | | | |
|---|---|---|---|
| 6,273,937 B1 * | 8/2001 | Schucker | 95/45 |
| 7,799,225 B1 * | 9/2010 | Snyder et al. | 210/644 |
| 2005/0205468 A1 * | 9/2005 | Cadours et al. | 208/189 |

* cited by examiner

*Primary Examiner* — Krishnan S Menon
(74) *Attorney, Agent, or Firm* — Mark C. Lang; Brian J. Lally; John T. Lucas

(57) ABSTRACT

The present invention relates to a functionalized membrane contactor extraction/reaction system and method for extracting target species from multi-phase solutions utilizing ionic liquids. One preferred embodiment of the invented method and system relates to an extraction/reaction system wherein the ionic liquid extraction solutions act as both extraction solutions and reaction mediums, and allow simultaneous separation/reactions not possible with prior art technology.

17 Claims, 11 Drawing Sheets

MEMBRANE CONTACTOR ASSISTED EXTRACTION/REACTION PROCESS EMPLOYING IONIC LIQUIDS

CROSS REFERENCE TO RELATED OTHER APPLICATIONS

This application is a Division of U.S. application Ser. No. 11/536,933, filed on Sep. 29, 2006 now abandoned, and related to U.S. application Ser. No. 11/536,905 filed Sep. 29, 2006, entitled "MEMBRANE CONTACTOR ASSISTED WATER EXTRACTION SYSTEM FOR SEPARATING HYDROGEN PEROXIDE FROM A WORKING SOLUTION, AND METHOD THEREOF", both of which are hereby incorporated by reference in their entirety.

STATEMENT OF GOVERNMENTAL SUPPORT

The United States Government has certain rights in this invention pursuant to Contract No. W-31-109-ENG-38 between the U.S. Department of Energy and the University of Chicago operating Argonne National Laboratory.

FIELD OF INVENTION

The present invention relates to a functionalized membrane contactor extraction/reaction system and method for extracting target species from multi-phase solutions utilizing ionic liquids. One preferred embodiment of the invented method and system relates to an extraction/reaction system wherein the ionic liquid extractants act as both extractants and reaction medium, which allows simultaneous separation/reactions not possible using prior art technology.

BACKGROUND OF INVENTION

Liquid-liquid separations of multi-phase solutions often present a multitude of challenges. For example, separating ethanol from a fermentation broth, or separating hydrogen peroxide from an anthraquinone starting solution, present a number of problems including but not limited to: emulsions, long separation times, and large capital and energy expenses. Thus the need for efficient, cost-effective separations is common to the generation of many bio and chemical based products and is a key technical barrier, often accounting for up to about 50% of the overall production costs.

Conventional separation strategies for bio-based products are based on distillation which requires boil-off of both the target bio-based product and large volumes of water, and is therefore very energy intensive. In an effort to reduce costs, the use of membrane based separation systems have been suggested for recovery of ethanol or other alcohols. Most such work has centered on pervaporation, a gas phase dense membrane technique. However, since pervaporation still requires significant heating step, the cost savings are only about 10-15% compared to traditional distillation.

Separation of chemicals such as hydrogen peroxide from starting solutions (i.e. working solution containing dissolved hydrogen peroxide) presents similar separation problems. For example, most known commercial methods for producing hydrogen peroxide use traditional water extraction methods (i.e. use of extraction columns) to separate hydrogen peroxide from an organic working solution. In such systems, the water and organic phases inevitable intermix leading to contamination of the resulting aqueous hydrogen peroxide solution. Cross-contamination between the aqueous and organic phases has been a long standing problem in the production of hydrogen peroxide. This contamination requires extra purification steps which are time and cost intensive. See, PCT Application PCT/SE97/02100, International Publication No. WO 98/28225, which is hereby incorporated by reference in its entirety. A number of similar hydrogen peroxide processes have been developed. See, also U.S. Pat. Nos. 6,596,884; 6,982,072; 5,071,634; and U.S. Patent Application No. US2006/0057057, all of which are hereby incorporated by reference in their entireties. Furthermore, prior art systems do not allow for the simultaneous separation of hydrogen peroxide with oxidation reactions (i.e. of propylene) which could revolutionize the industry.

There exists a need in the art for a new liquid-liquid extraction method for separating target species from starting solutions which overcomes some or all of the problems associated with current methods. There also exists a need in the art of a new system and method that allows simultaneous separation/reactions.

BRIEF SUMMARY OF THE INVENTION

The present invention relates to a membrane contactor assisted extraction system and method for extracting a target species from a multi-phase solution using ionic liquid extractants.

Another embodiment relates to a membrane contactor assisted extraction/reaction system and method for extracting a species from a multi-phase solution using ionic liquid extractants and simultaneously reacting the extracted species with other compound(s) using the ionic liquid as both an extractant and reaction medium.

One preferred embodiment of the invention relates to a method and system for membrane contactor assisted extraction bio-based products such as ethanol from a fermentation broth. The system can also be used to separate other alcohols such as butanol and various polyols.

Another preferred embodiment of the invention relates to a method and system for membrane contactor assisted extraction of hydrogen peroxide ($H_2O_2$) from a starting solution.

Yet another preferred embodiment of the invention relates to a method and system for direct epoxidation of propylene to propylene oxide.

The invented system and process employs a membrane contactor (MC), which uses the membrane as a contactor only. A membrane contactor system works on the principal of using a membrane, which can be wetted by solution on one side of the membrane only, to serve as a contacting medium for the extraction. This set-up results in good extractant rates because the extracted component (i.e. alcohol, $H_2O_2$) has a high affinity for the extractant, and preferably for the membrane surface as well. More importantly, however, is that the two-phases come into contact with each other in the membrane pores only and thus undesirable dissolution of the two phases into each other is much reduced.

The invented membrane contactor assisted extraction with tailored ionic liquid solvent can be used as a very important technology platform to capture the dilute products of non-charged biobased products, such as alcohols including ethanol and butanol, or polyols from fermentations. Polyols are chemical compounds containing multiple hydroxyl groups. Polyols produced by fermentation are typically sugar alcohols and include, but not limited to: sorbitol, mannitol, xylitol, and erythritol. This platform could enable continuous fermentations that can significantly reduce the energy and process operation cost and is one of the most targeted technologies for biorefinery industry. One embodiment of the invention describes a novel system and method by which alcohol (or polyols) can be recovered from fermentation broth using a membrane contactor with ionic liquids as the solvent.

One embodiment of the invented method and system for alcohol extraction eliminates the heating step of previous methods, instead extracting alcohol directly from the fermentation broth via a liquid/liquid extraction across a membrane contactor using ionic liquid extractants. The alcohol is extracted from the ionic liquid solvent by evaporation or stripping without volatilizing the solvent.

In the case of extraction of $H_2O_2$ from an organic starting solution, the present invention is extremely advantageous because the reduction of the organics dissolved after the extraction to a significantly reduced concentration (<<500 mg/L). Thus, expensive post-processing such as activated carbon adsorption, distillation, etc., might be reduced or even eliminated.

The present invention's use of specialized extractants (i.e. ionic liquids) in conjunction with functionalized membrane contactors leads to a novel and effective separation system and reaction method. By enabling new reaction environments, the use of ionic liquids in the invented system allows catalytic reactions and separations never before possible.

One example of combining separation and reaction steps is the separation of hydrogen peroxide and the use of the separated hydrogen peroxide in organic oxidations. Utilization of $H_2O_2$ for organic oxidations (extremely important industrial chemical reactions) requires that the water content remain low, and therefore, the state of the art membrane approach still requires the concentration and dilution steps to remove the water. In order to overcome this barrier, the current invention proposes a process that delivers the $H_2O_2$ to a solvent suitable for both organic oxidations and product recovery. This strategy bypasses the needs of recovery, concentration, and handling of $H_2O_2$ and uses the extractant as both extractant and reactant for organic oxidations. This direct extraction using MC without the need for downstream processing could be the holy grail of hydrogen peroxide separation.

One example of using solvent (i.e., ILs) for both extraction and reaction medium is the production of propylene oxide (PO) via propylene epoxidation. PO is a very large volume chemical used throughout the chemical industry. Thus, an improved process could have substantial energy savings.

One way to produce PO without byproducts is by epoxidation of propylene with $H_2O_2$. In conventional processes, propylene gas is fed into a reactor that contains a methanol-water mixture blended with $H_2O_2$. Because $H_2O_2$ and propylene do not mix, the methanol solution is used to partially dissolve the propylene gas for the reaction. Excess water in the reactor reacts with PO to form unwanted propylene glycol and other polyglycol byproducts. Because $H_2O_2$ in the PO production is consumed, an inexpensive supply of $H_2O_2$ is a critical economic factor. Researchers have been trying to develop methods to substitute the $H_2O_2$ by directly adding $H_2$ and $O_2$ with propylene or using a nano-gold particle membrane to in-situ generate $H_2O_2$ for the reaction. However, rapid catalyst degradation makes these approaches unsuitable for a commercial process. So far, the most economical and safest process to produce $H_2O_2$ is still the anthraquinone process.

Another technology developed by Degussa AG combines the $H_2O_2$ production, extraction and PO production in a one-step process. In their system, the alcohol-water mixture is used first as the solvent to extract the $H_2O_2$ from the organic solvent (using conventional liquid-liquid extraction), and second as the reaction medium for $H_2O_2$ propylene epoxidation. However, the loss of the expensive anthraquinone (AQ) catalyst into the extracting alcohol-water mixture, due to the alcoholic solubility of AQ, is a serious economic drawback.

The currently invented integrated process can potentially avoid these drawbacks by using membrane contactor/tailored solvent technology to extract $H_2O_2$ from the organic starting solution, in situ, and directly convert propylene to PO.

In one embodiment an extracting solvent of tailored IL with very hydrophilic properties combined with a functionalized hydrophilic membrane barrier minimizes the loss of AQ into the PO reaction medium. Avoiding use of water in the extraction solvent will significantly reduce the formation of unwanted byproducts in the reaction medium for PO epoxidation. The PO (b.p. 34° C.) can be easily be recovered from the IL by low temperature evaporation without volatilization of the solvent. The IL can be recycled back to the membrane contactor/reactor. Integration of $H_2O_2$ production and propylene epoxidation will result in substantial energy savings. Low water concentration in the reactor can be maintained by a slipstream stripping after PO recovery.

The selectivity of the functionalized membrane contactor and extraction solvent act of the present invention act synergistically to improve the separation efficiency in comparison to direct liquid-liquid extraction process. The membrane contactor separations can operate at ambient temperatures and do not require energy to vaporize components. In comparison, the conventional liquid-liquid extraction often requires two-phase separation of an emulsion, an inherently imprecise and messy process.

DETAILED DESCRIPTION OF THE PREFERRED EMBODIMENT

The present invention generally relates to a method and system for separating a target species from a multi-phase solution. More specifically one preferred embodiment of the invention relates to a method and system for membrane contactor assisted extraction (MCAE) of a target species from a starting solution generally comprising: at least one membrane contactor reactor (MCR) means for separating a target species from a starting solution; a starting solution supply means for supplying a stream of starting solution containing said target species to the MCR means; an extractant supply means for supplying a stream of extractant to the membrane contactor reactor means, wherein the extractant comprises: at least one ionic liquid.

Figure 8:
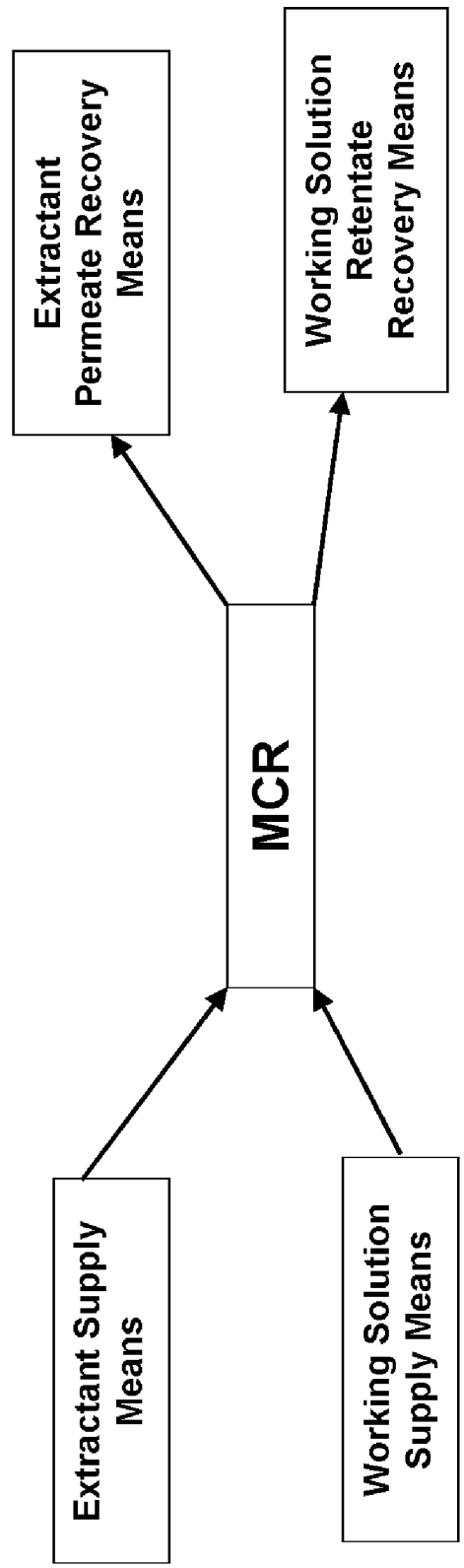
FIG. 8 is a schematic of one embodiment of the invented membrane contactor extraction system.

FIG. 8 is a schematic diagram of the one embodiment of the present invention generally comprising: an extractant supply means 410, a starting solution supply means 411, a membrane contactor reactor 401, a permeate recovery means 412, and a starting solution retentate recovery means 413. The extractant and starting solutions means provide streams of their respective solutions to the membrane contactor reactor means 401 which separates target species from the starting solution, forming a starting solution retentate (having a reduced concentration of target species) and an extractant permeate containing a concentration of the target species. At least a portion of the extractant permeate being recovered by the extractant permeate recovery means 412 at least a portion of the starting solution retentate being recovered by the starting solution retentate recovery means 413.

Membrane Contactor Reactor

The membrane contactor reactor is a salient aspect of the invented system. In the most basic form, the membrane contactor (MC) reactor comprises a functionalized membrane acting as, and known as a membrane contactor, having a starting solution containing a target species on one side of the membrane and an extractant on the other side. The use of the terms membrane and membrane contactor in relation to MCR of the present invention are used interchangeably, as the membranes of the MCR of the present invention are necessarily membrane contactors.

Figure 9:
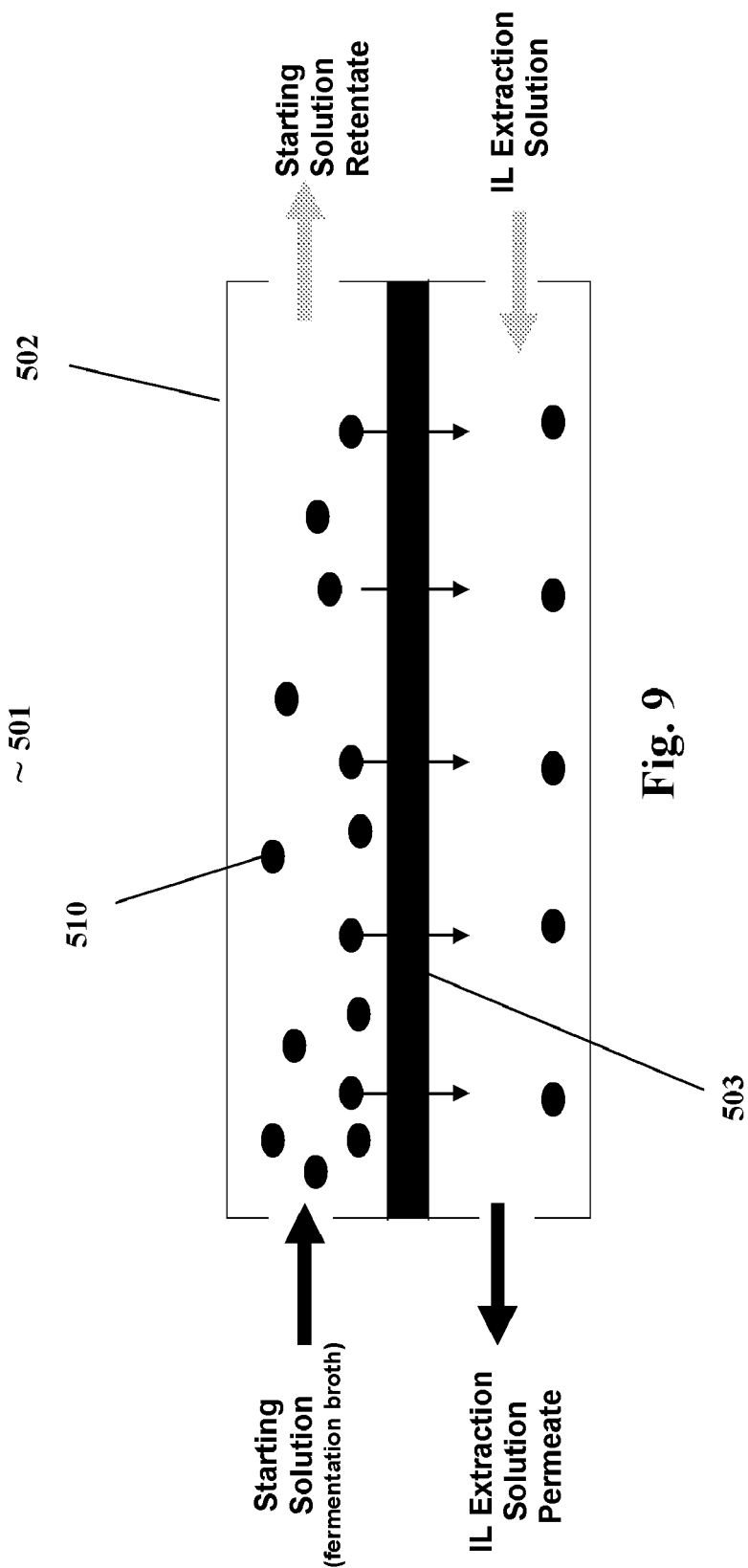
FIG. 9 is a side view of one embodiment of a membrane contactor reactor of the present invention.

FIG. 9 illustrates a preferred embodiment the membrane contactor reactor 501 comprising: a membrane contactor 503 positioned within an outer housing 502 that houses the membrane contactor in which the starting solution containing the target species (i.e. $H_2O_2$) flows on one side of the membrane and the ionic liquid containing extractant flows on the other side. As the starting solution flows along the membrane a portion of target species 510 migrates from the starting solution, across the membrane, and into the extractant (having an affinity for the desires species) forming an extractant permeate containing a concentration of the target species. Preferably the two fluids flow parallel or near parallel to each other. The membrane is preferably a functionalized membrane and the extractant an ionic liquid.

Membrane contactor reactors can be purchased as entire units (outer cylinder and membrane contactor) or constructed from separate components. Commercially available membrane contactor reactors can be purchased from CeraMem, which manufactures and sells membrane contactors as well as membrane contactor housings. (Waltham, Mass.).

Figure 1:
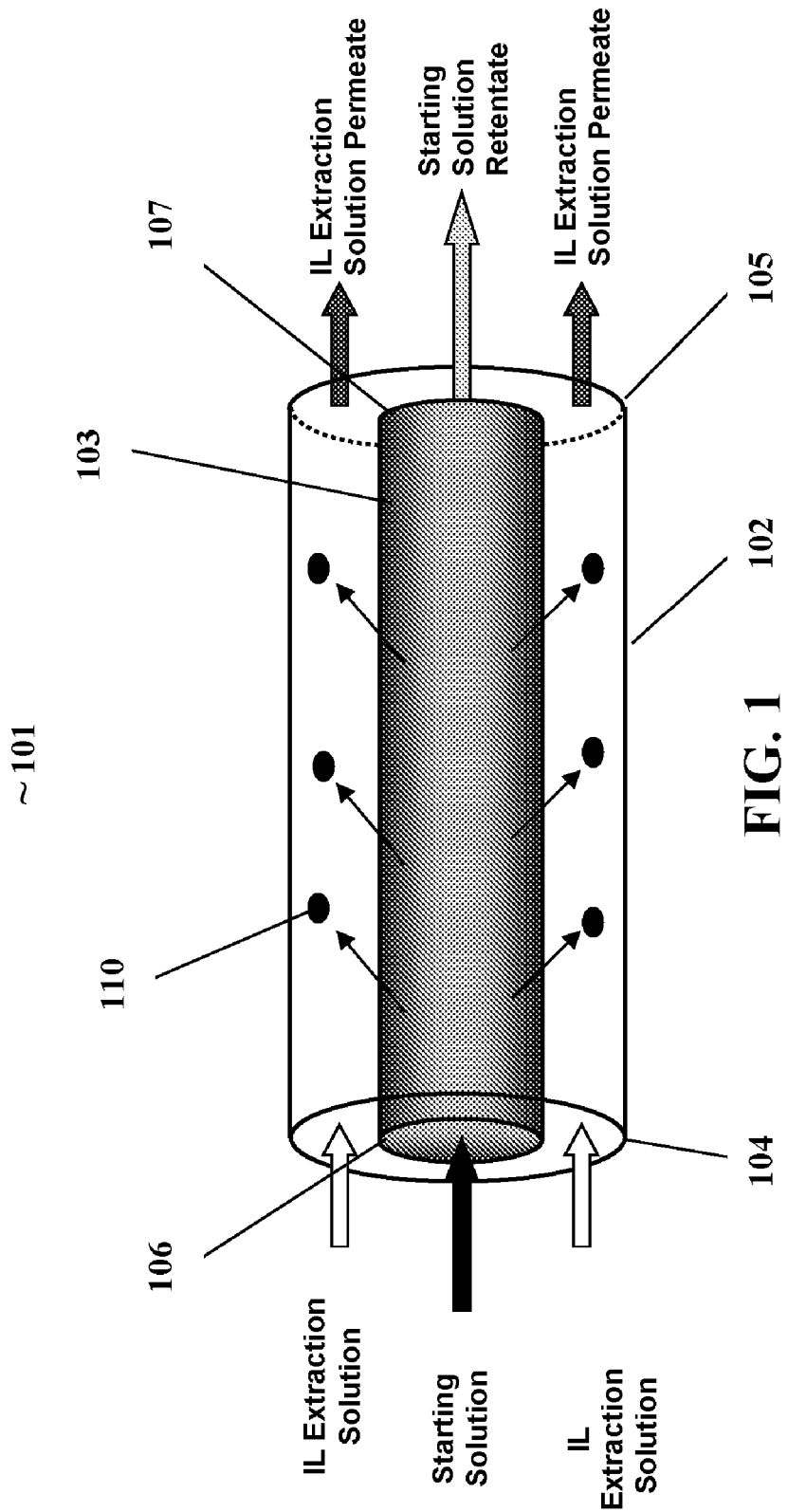
FIG. 1 is a side view of one embodiment of a membrane contactor reactor of the present invention.

FIG. 1 illustrates one preferred embodiment of a membrane contactor reactor for the invented membrane contactor extraction system. The illustrated membrane contactor reactor (MCR) 101 generally comprises an outer reactor cylinder (ORC) 102 having an inlet end 104 and an outlet end 105; and a coaxial cylindrical membrane contactor (CCMC) 103 positioned within the ORC 102. The CCMC also has an inlet end 106 end and outlet end 107.

The inlet end of the CCMC 106 receives a stream of starting solution from a starting solution supply means (not shown), and the inlet of the ORC 104 receives the stream of extractant from an extractant supply means (not shown); whereby the dissolved target species 110 present in the starting solution permeates through the membrane into the extractant creating a extractant permeate solution (containing a concentration of the target species) which exits the outlet of the ORC 105. As the starting solution passes through the reactor the concentration of the target species present in the starting solution is reduced, the starting solution ultimately exiting the CCMC outlet 107 as a starting solution retentate. The illustrated system employs a co-current flow scheme in which the extractant and starting solutions flow in the same direction, however, the solutions could stream in a counter-current arrangement as well.

It should also be noted that the starting solution can be flowed through the ORC and the extractant through the CCMC, as shown in some of the embodiments below.

Figure 2:
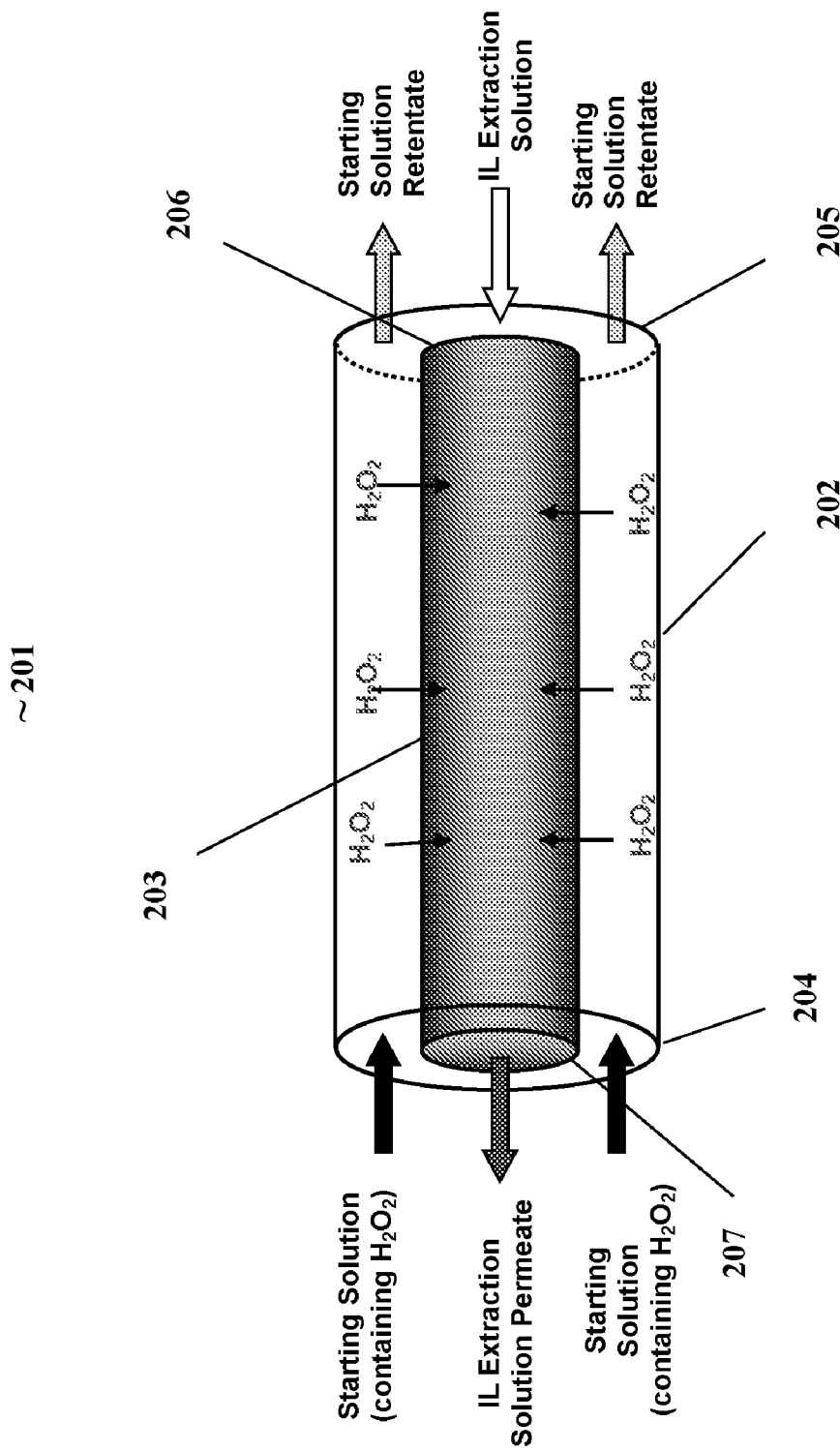
FIG. 2 is a schematic of one embodiment of the membrane contactor reactor system for separating hydrogen peroxide from a starting solution.
Figure 3:
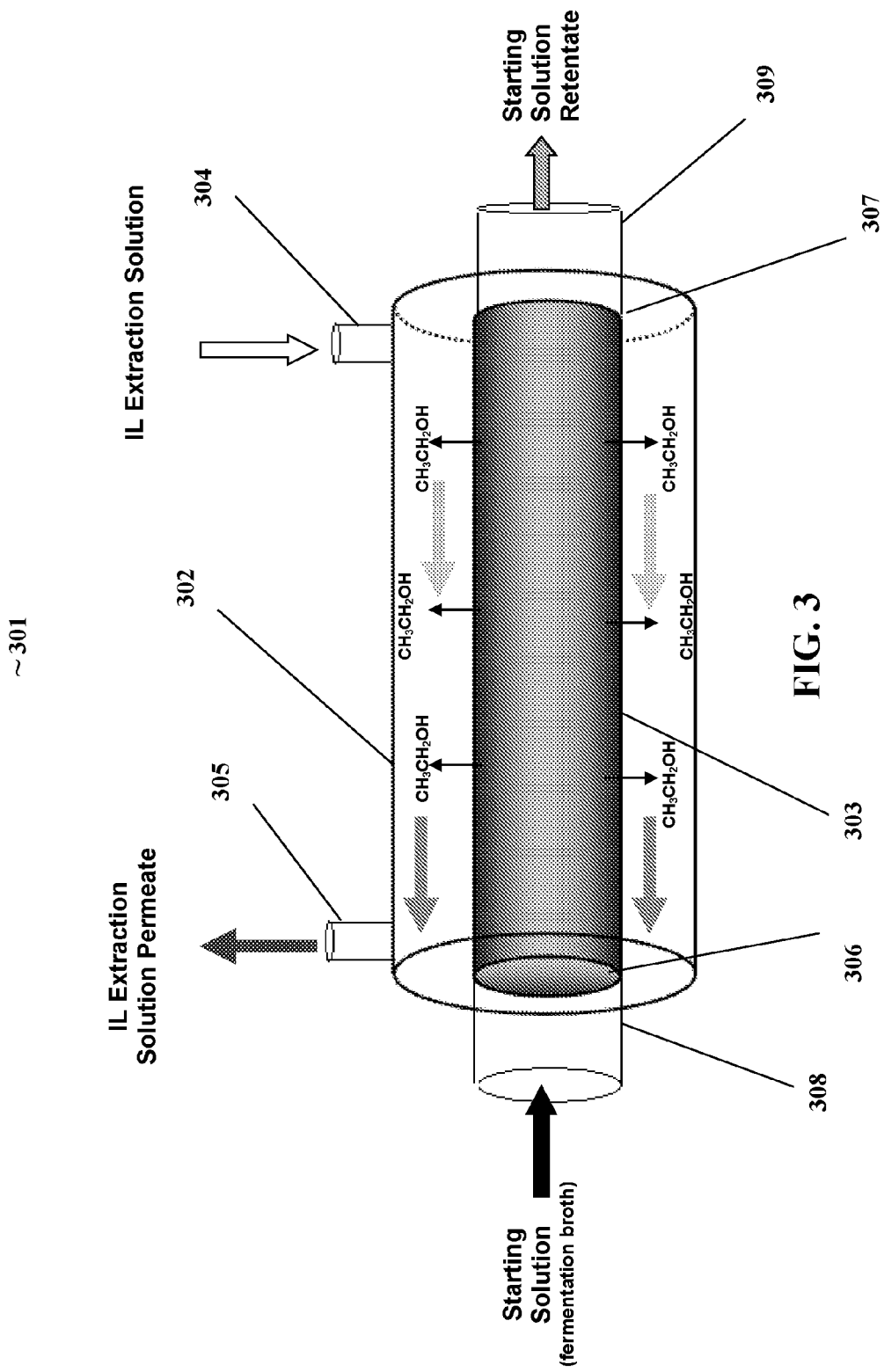
FIG. 3 a schematic of one embodiment of the membrane contactor reactor system for separating alcohols such as ethanol or butanol from a fermentation broth.

In the preferred embodiment the membrane contactor (and MCR) has a cylindrical shape with a central aperture running the length of the membrane as shown in FIGS. 1-3. The cylindrical membrane maximizes the surface interaction between the starting solution and extraction solution while still maintaining phase separation between the solutions. Although, a cylindrical membrane (and reactor) is preferred, linear, and other various shaped membranes and reactors, with or without multiple coaxial channels can be employed. In one configuration multiple coaxial ORC's and CCMC's are present in a single MCR. For example, the CeraMem MCR is designed with a coaxial honeycomb structure.

It should be noted that the current system can employ one or more MCRs aligned in series and/or parallel.

Functionalized Membrane Contactor

The functionalized membrane is a salient aspect of the present invention. A preferred membrane material has high porosity, uniform pore sizes, the ability to wet one phase only, and a relatively high contact angle with the other phase. High porosity can create high contact area for the two liquid phases. The high contact angle of one liquid phase against the solid membrane surface would minimize the specific liquid phase to cross over the porous membrane. The role of the membrane contactor in the MCR system is to keep the phases of the starting solutions and extractant separated and to provide an interface between the two phases. The interface between the two phases is immobilized by using functionalized membranes and a small trans-membrane pressure gradient (~0.1 bar). The functionalization and other details of the membrane are discussed below.

In general, any membrane with properly functionalized surfaces can be used as a membrane contactor. The membrane can be constructed out of a variety of materials. Suitable materials include but are not limited to: silicon dioxide, alumina, silica, stainless steel, and Nafion™ ((DuPont, Wilmington, Del.), ceramic, or cellulose. When used to extract species such as hydrogen peroxide, the membrane material must also be resistant to oxidizers and/or different kinds of solvents. One preferred membrane for hydrogen peroxide extraction is a CeraMem membrane having an internal surface of about 1000 $m^2/m^3$, manufacture by CeraMem, Inc., (Waltham, Mass.).

The preferred pore size of the membrane will depend on the properties of the starting solution, target species being extractant, and extractant. For example, membranes used in separation of hydrogen peroxide can generally be up to about 2 µm in pore size, preferably the pores are between about 1 nm and 50 nm to prevent unimpeded flow.

The performance of MCs in liquid-liquid separations strongly depends on the properties of the membranes employed and their relation to the wetting and non-wetting solutions. An important criterion for selecting a proper membrane is the wetability of the membrane by either the starting solution or extractant solution. Typically the extraction solvent acts as the wetting solution, however, this is not always the case.

In general, the surface of the chosen membrane should be functionalized, or have properties (i.e. be hydrophilic or hydrophobic) that are similar to the wetting liquid and preferably opposite to the non-wetting solution. Preferably, the membrane has similar properties as the extractant (and target species) so that they work synergistically to extract the target species.

Figure 4:
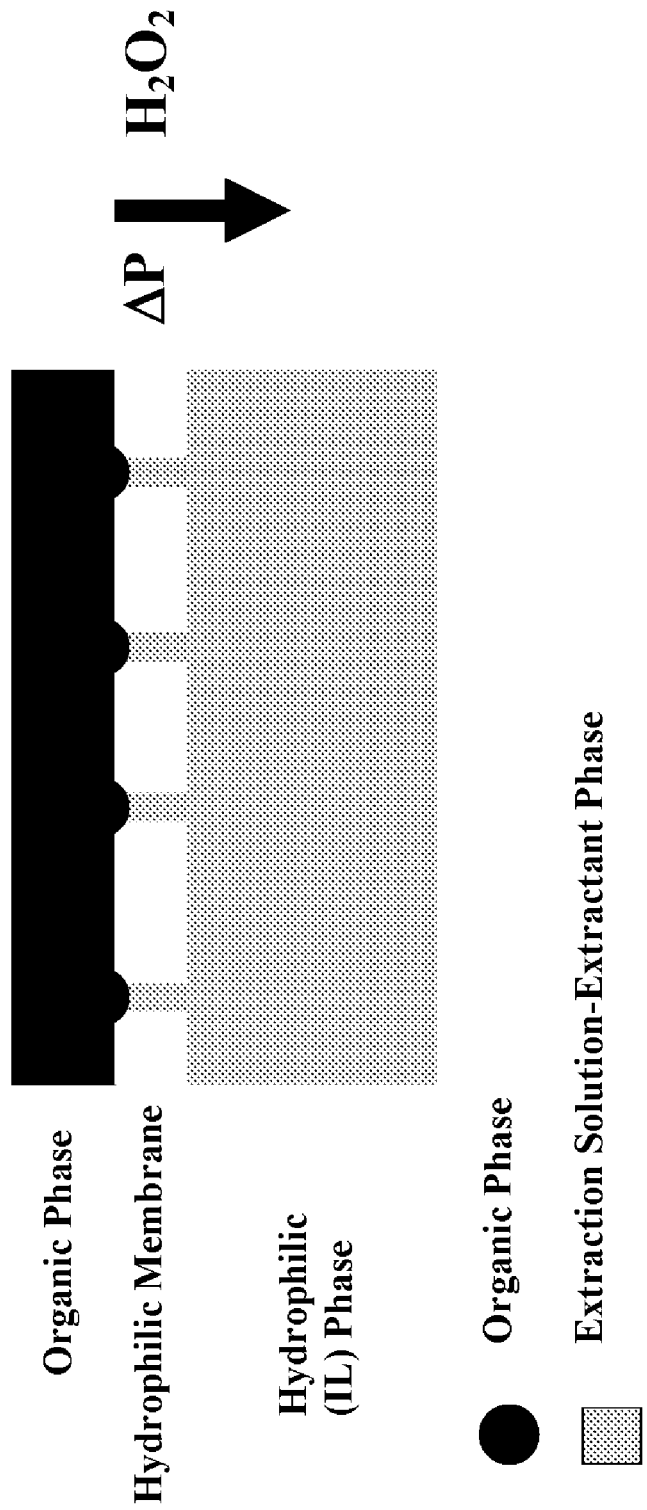
FIG. 4 is a partial cut away of a membrane contactor reactor system of the present invention employing a hydrophilic membrane and hydrophilic extractant.

FIG. 4 illustrates a preferred embodiment of the invented system for hydrogen peroxide separation wherein the membrane contactor is hydrophilic, a hydrophilic ionic liquid acts as the extractant and as the wetting liquid, and the organic starting solution (being very hydrophobic) acts as the non-wetting liquid. The membrane's affinity for hydrogen peroxide acts synergistically with the extractant (which also has an affinity for hydrogen peroxide) to increase the ability of the hydrogen peroxide to permeate into the extractant. In the illustrated arrangement, the organic starting solution is preferably slightly pressurized, so that the water extractant will wet the membrane but the organic phase will not go through and only an extraction takes place. If a hydrophobic membrane were being used then one would pressurize the system the other way.

When pressurizing the system, the positive pressure applied, by the pressurized solution, on the membrane contactor cannot exceed the osmotic pressure of the solution which is wetting the membrane. For example, in the illustrated system of FIG. 4, the positive pressure applied on the membrane from the pressurized starting solution should not exceed the osmotic pressure of the extractant solution such that the starting solution will not breakthrough the membrane into the extraction solvent.

Figure 5:
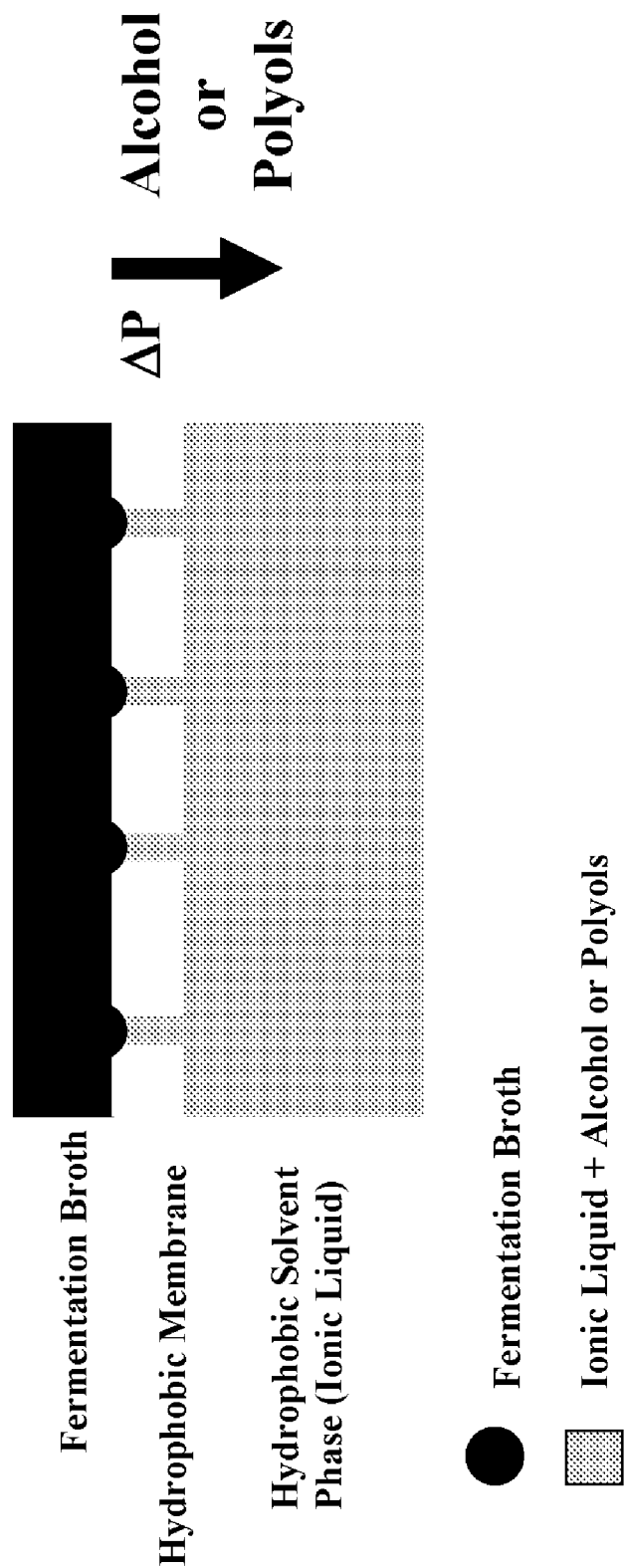
FIG. 5 is a partial cut away of a membrane contactor reactor system of the present invention employing a hydrophobic membrane and hydrophobic extractant.

FIG. 5 illustrates a preferred embodiment of the invented system for extraction of ethanol, butanol or polyols from a fermentation broth wherein the membrane contactor is contains a hydrophobic surface on one side of the membrane, a specialized hydrophobic ionic liquid acts as the extractant and as the wetting liquid, and the fermentation starting solution acts as the non-wetting liquid. The membrane's affinity for ethanol acts synergistically with the extractant (which also has an affinity for ethanol) to increase the ability of the ethanol to permeate into the extractant. In the illustrated arrangement, the starting solution is preferably slightly pressurized, thus the ionic liquid extractant will wet the membrane but the starting fermentation phase will not go through and only an extraction takes place. If a hydrophobic membrane and extractant were being used then one would pressurize the system the other way.

Table I presents a list of suitable combinations of starting solutions, membranes extractants, and pressurizations depending on the properties of the target species being extracted.

TABLE I

| Target Species | Starting Solution | Membrane | Extractant | Pressure |
| --- | --- | --- | --- | --- |
| Hydrophilic | Hydrophobic | Hydrophilic | Hydrophilic | Pressurize starting solution |
| Hydrophilic | Hydrophobic | Hydrophobic | Hydrophilic | Pressurize extractant |
| Hydrophobic | Hydrophilic | Hydrophobic | Hydrophobic | Pressurize starting solution |
| Hydrophobic | Hydrophilic | Hydrophilic | Hydrophobic | Pressurize extractant |

Δ Pressure

Preferably, the pressure of the non-wetting solution is elevated to a slightly higher value than that of the wetting solution creating a pressure gradient ΔP across the membrane which helps maintain the interface between the two phases. The pressure of the non-wetting solution, however, must not exceed a critical threshold known as the breakthrough pressure (i.e. the pressure at which the non-wetting solution will penetrate the membrane). The Laplace equation offers a relationship between the pore size of the membrane, $r_{pore}$ and the breakthrough pressure, ΔP:

$$\Delta P = (2 \Theta \gamma \cos \theta)/r$$

Here γ is the interfacial tension, Θ is a geometric factor related to the pore structure (equal to 1 for cylindrical pores) and θ is the liquid-liquid contact angle. Thus breakthrough pressures can be calculated for various systems. Breakthrough pressure data for several membrane types and fluids can be found in the literature. (See, Membrane Contactors, in Membrane Separation Technology, Principles and Applications, Reed, B. W. et al., 1995 (Elsevier), which is hereby incorporated by reference in its entirety. The pressure gradient can be created and maintained using a number of means well known in the art, including use of various pressure/flow meters and controls.

Outer Reactor Cylinder (ORC)

The ORC (or outer container) can be constructed of a myriad of materials including but not limited to: ceramics, various metals, and plastics such as PVC. As described earlier the ORC may be incorporated into a prefabricated MCR.

Extraction Solution (and Supply Means)

A salient aspect of the present invention is use of ionic liquid extraction solutions. The invented system and method employs the use of ionic liquids (IL) as extraction solution solvents. Preferably the ionic liquid extractant has an affinity for the target species being extracted, more preferably a strong affinity for the target species. In a preferred system, the membrane and extractant both have an affinity for the target species and act synergistically to extract the target species from the starting solution. One measurement of the affinity is the miscibility (or the solubility). For example, an ionic liquid claimed as completely immiscible with water could have water solubility about 1 wt. %.

The preferred ionic liquid solution for a particular separation will depend on the properties of the target species, the starting solution, and/or the membrane. In addition, as discussed in detail below, the ionic liquid can be customized to act as both an extraction solution and a reaction medium.

Theoretically any IL solvent system can be used as both the extracting solvent and the reaction medium. The IL solvent system requires the following properties: (1) solubility of the target species (i.e. $H_2O_2$) but not the starting solution (i.e. organic working solution or the catalyst, AQ) to enable extraction from the starting solution; (2) tunable properties for enhancing catalytic activity and selectivity; (3) low volatility to enable removal of the product (e.g., PO) and byproducts; and (4) low overall solvent, reactant, and product loss.

The range of available cations and anions for ionic liquids has expanded enormously and there are approximately one trillion available room temperature ionic liquids. Low vapor pressures (near zero), low melting points, and easily tailored properties such as full or partial hydrophilicity/hydrophobicity make ionic liquids a near ideal extraction solvent for liquid-liquid extraction. While drawing a profound attention as separation solvent for industrial usages, the IL can also be tailored to work as a reaction medium. In such a case, any reaction products that are volatile chemicals can be easily separated by evaporation from the reaction medium without solvent distillation. This would result in significant savings of energy and process costs and could improve reaction rates. ILs can be purchased from a variety of manufactures including but not limited to Merck KGaA in Germany (distributed by Sigma Aldrich or EDM in U.S.) or synthesized in house.

The reactant species (e.g. propylene) can be added directly to the IL extraction solution to create an extraction/reaction solution. Various reaction catalysts can be added to the extraction solution or incorporated into the membrane in the MCR. This embodiment enables the extracted species (e.g. hydrogen peroxide) to be used in situ for immediate reaction to produce a secondary product(s) (e.g. conversion of the reactant propylene to the product propylene oxide).

The extractant can be supplied to the MCR in a variety of means known in the art including but not limited to liquid pumps which pump the solution from an extractant supply.

Starting Solution (and Supply Means)

The starting solution can be a myriad of solutions containing a dissolved target species to be extracted. The composition of a particular starting solution will vary according to the target species (e.g., ethanol) and the methods, materials, and systems used to produce to the starting solution. Exemplary starting solutions including fermentation broths, and chemical working solutions, however, a myriad of solutions could be employed.

The presently invented system's ability to limit the contact between the aqueous and organic phases during separation may allow the use of new or previously unpractical starting solutions.

The starting solution can be supplied to the MCR in a variety of means known in the art including but not limited to liquid pumps which pump the solution from a working solution supply.

Recovery Means

As shown in FIG. 8 extraction recovery means for the extraction permeate and starting solution retentate can be employed to recover the solutions as they exit the respective outlets of the membrane contactor reactor. Various recovery means known in the art can be employed including but not limited to storage vessels. The recovery means can recover a portion or all of the resulting solutions. Alternatively, the target species can be stripped from the extraction permeate, and then recovered using a recovery means. The ionic liquid extractant could then be recovered or recycled.

In another embodiment the target species present in the extractant permeate simultaneously reacts with a reactant within the extraction solution creating a reaction product, which can then be recovered. The reaction product can be stripped from the extraction permeate, and then recovered using a recovery means. The ionic liquid extractant could then be recovered or recycled.

The extraction permeate, stripped target species, and/or reaction product can be further purified, distilled or modified.

Means for Stripping Target Species/Reaction Product from the Ionic Liquid Extractant The target species can be stripped from the ionic liquid using a number of means and methods known in the art including but not limited to: evaporation, thin film evaporation and distillation.

The energy required to strip the target species (or reaction product) is generally low as ionic liquids have extremely low vapor pressures, approaching zero. For example, while it is energy intensive to separate ethanol from water, it is easy to separate ethanol from very low vapor pressure ionic liquids. See, Earle, M. J. et al., "Ionic Liquids. Green Solvents for the future", Pure Appl. Chem., Vol. 72, No. 7, pp 1391-1398. 2000.

Example I

Bio-Based Separation System

FIG. 3 illustrates one embodiment of a membrane contactor reactor for separating a biobased product such as ethanol from a fermentation broth. The illustrated membrane contactor reactor (MCR) 301 generally comprises an outer reactor cylinder (ORC) 302, having an ORC inlet 304 and an ORC outlet 305; and a coaxial cylindrical membrane contactor CCMC 303 positioned within the ORC 302. The CCMC having an inlet end 306 end and outlet end 307. The ORC further having a CCMC inlet 308 and CCMC outlet 309. The CCMC inlet 308 connected to the inlet end of the CCMC 306, the CCMC outlet 309 connected to the CCMC outlet end 307. The ORC 302 is an enclosed hollow cylinder with the exception of the ORC inlet and outlet, and CCMC inlet and outlet.

The ORC inlet 304 and outlet 305 provide fluid communication between the outside and inside of the ORC. The CCMC inlet 308 and outlet 309 provide fluid communication between the outside and the central aperture of the CCMC. The CCMC can be attached and supported within the ORC in a variety of means known in the art, including physical and chemical bonding agents and devices. For more information regarding membrane contactor reactors see U.S. Pat. No. 6,830,737 and Published U.S. patent application Ser. No. 11/153,534 which are incorporated by reference in their entireties. The illustrated system employs a counter-current flow scheme in which the extractant and starting solutions flow in opposite directions; however, the solutions could stream in a co-current arrangement as well.

The inlet of the ORC 304 receives a stream of starting solution from a starting solution (i.e. fermentation broth) supply means (not shown), and the inlet of the CCMC 306 receives a stream of extractant from an extractant supply means (not shown); whereby the dissolved ethanol present in the starting solution permeates through the membrane into the extractant creating a extractant permeate solution (containing ethanol) which exits the outlet of the CCMC 307. As the starting solution passes through the reactor, the concentration of ethanol present in the starting solution is reduced, the starting solution ultimately exiting the CCMC outlet 309 as a starting solution retentate. For more information regarding membrane contactor reactors see U.S. Pat. No. 6,830,737 and Published U.S. patent application Ser. No. 11/153,534 which are incorporated by reference in their entireties.

A suitable extractant solution comprises an ionic liquid having an affinity for ethanol, preferably a strong affinity for ethanol. One preferred extractant for separation of ethanol from a fermentation broth is a hydrophobic ionic liquid having a very low vapor pressure. Suitable ionic liquids are 1-Butyl-1-methylpyrrolidinium bis(trifluoromethylsulfonyl)imide ([bmpyr][Tf2N]) ($C_{11}H_{20}F_6N_2O_4S_2$), or 1-hexyl-3-methylimidazolium bis(trifluoromethyl)sulfonylimide ([hmim][Tf2N]) ($C_{12}H_{19}F_6N_3O_4S_2$) or similar liquids.

One suitable functionalized membrane system for ethanol extraction is illustrated in FIG. 5 which has been described above in detail. A suitable membrane for ethanol extraction is the silicon-oxide based ceramic membrane (LM-0005-S) from CeraMem, Inc., (Waltham, Mass.). The pore size could vary in range, however, the pores are preferably in the range 1-100 nm with pressures from about 1-20 psig.

The starting solution is streamed into the MCR for ethanol production may be any of a myriad of fermentation starting solutions containing ethanol. Fermentation is one of the oldest chemical processes known to man and there exist a number of methods for converting biomass to sugars and then fermenting the sugars to form a fermentation broth containing ethanol. For example, ethanol can be produced from virtually any carbohydrate (or cellulose containing) biomass possible of being converted to sugars, including but not limited to: grain, sugar cane, molasses, fruit, whey, and cellulose based sources such as switch grass etc. Starches from grains are enzymatically converted to sugars before being converted to ethanol by fermentation using yeast (or certain bacteria).

Ethanol can be produced using traditional yeast fermentation methods or through the use of specialized bacteria. A number of bacteria can be used including but not limited to *Clostridium sporogenes, Clostridium indolis, Clostridium sphenoides, Clostridium sordelli, Zymomonas mobilis, Spirochaeta aurantia, Spirochaeta stenostrepta, Spirochaeta litoralis, Escherichia coli, Erwinia amylovora, Leuconostoc mesenteroides, Sreptococcus lactism* and *Sarcina ventriculi*. Methods for producing fermentation broths containing ethanol using bacteria are well known in the art. See, U.S. Pat. Nos. 4,769,324; 5,000,000; 5,542,202; and 5,554,520 which are all incorporated by reference in their entireties.

Ethanol can also be produced using traditional yeast fermentation of sugars. Suitable yeasts include but are not limited to: *Saccharomyces cerevisiae, S. uvarum, Schizosaccharomyces pombe*, and *Kluyueromyces* sp. Methods of fermenting sugars into an ethanol-water fermentation broth using yeast and/or yeast enzymes are well known in the art. See, U.S. Pat. Nos. 4,242,454; 3,940,492; and 3,737,323 which are all incorporated by reference in their entireties.

Ethanol can also be produced using specialized bacteria that ferment synthesis gas (a mixture of hydrogen, carbon monoxide, and/or carbon dioxide with other trace components). These specialized bacteria that convert synthesis gas include but not limited to: *Clostridium ljungdahlii, Clostridium carboxidivorans, Clostridium scatologens* or *Clostridium drakei*.

The starting solution (i.e. fermentation broth) preferably comprises: a water/ethanol mixture which is between about 0.5-15 weight percent ethanol, preferably between about 3-11 weight percent ethanol. Preferably the starting solution has been pre-filtered to remove a majority of solids and/or $CO_2$ as is known in the art.

The ethanol target (or other bio-based product) can then be stripped from the ionic liquid using a number of means and methods known in the art including but not limited to: evaporation, thin film evaporation and distillation.

Although ethanol was used as an example, as noted above, the invented system can be used to separate other bio-based products including but not limited to alcohols like butanol and various polyols from starting solutions. Polyols are chemical compounds containing multiple hydroxyl groups. Polyols produced by fermentation are typically sugar alcohols and include, but not limited to: sorbitol, mannitol, xylitol, and erythritol.

Example II

Hydrogen Peroxide Separation System

FIG. 2. illustrates a preferred embodiment of a membrane contactor reactor for the extraction of hydrogen peroxide from a working solution. The illustrated membrane contactor reactor (MCR) 201 generally comprises an outer reactor cylinder (ORC) 202 having an inlet end 204 and an outlet end 205; and a coaxial cylindrical membrane contactor CCMC 203 positioned within the ORC 202. The CCMC 203 also having an inlet end 206 end and outlet end 207.

The inlet end of the ORC 204 receives a stream of starting solution from a starting solution supply means (not shown), and the inlet of the MC 206 receives a stream of extractant from an extractant supply means (not shown); whereby the dissolved hydrogen peroxide present in the starting solution permeates through the membrane into the extractant creating a extractant permeate solution (containing hydrogen peroxide) which exits the outlet of the CCMC 207. As the starting solution passes through the reactor the concentration of hydrogen peroxide present in the starting solution is reduced, the starting solution ultimately exiting the ORC outlet 206 as a starting solution retentate. The illustrated system employs a counter-current flow scheme in which the extractant and starting solutions flow in opposite directions; however, the solutions could stream in a co-current arrangement as well The extractant for separating hydrogen peroxide can be a number of ionic liquids known in the art. Preferably the ionic liquid has an affinity for hydrogen peroxide, more preferably a strong affinity for hydrogen peroxide. Suitable ionic liquids include but are not limited to:

[1-Buty-3-Methyl-3H-imidazolium+][tetrafluoro borate–] ($BmIm^+$-$BF_4^-$);

[1-Buty-3-Methyl-3H-imidazolium+][trifluoro-methane-sulfonate–] ($BmIm^+$-$CF_3O_3S^-$); or

[1-Hexyl-3-methylimidazolium+][tetrafluoro-borate–] ($HmIm^+$-$BF_4^-$]).

One suitable functionalized membrane system for $H_2O_2$ extraction is illustrated in FIG. 4 which has been described above in detail. One preferred membrane is a CeraMem membrane having a surface of about 1000 $m^2/m^3$, manufactured by CeraMem, Inc., (Waltham, Mass.).

The starting solution streamed into the MCR can be any of a myriad of organic starting solutions containing dissolved hydrogen peroxide. Since most commercial methods for producing hydrogen peroxide utilize an anthraquinone (or anthraquinone derivative/analog) based starting solution, the starting solution preferably an anthraquinone based starting solution containing dissolved hydrogen peroxide.

The production of anthraquinone based starting solutions containing dissolved hydrogen peroxide are well known in the art. (See, U.S. Pat. Nos. 5,147,628; 5,071,634; 5,296,104; 6,224,845; 6,596,884 and 6,982,072, See, also Ullmann's Encyclopedia of Industrial Chemistry, $5^{th}$ ed., vol. A13 pp 447-456; all of which are hereby incorporated by reference in their entireties.

A suitable starting solution comprises dissolved hydrogen peroxide. Typically the starting solution (or working solution (WS)) comprises: dissolved hydrogen peroxide; one or more components of the group consisting of: the catalyst, anthraquinone (AQ), (tetrahydro)anthraquinone (THAQ)

and/or analogs and derivatives thereof; and various polar and/or non-polar organics (e.g., xylene).

Suitable membrane contactor reactors, working solutions, extractants and other details have been described above. The extractant and $WS_{MCR}$ can be streamed in co-current or counter current orientations. The invented method reduces or even eliminates the step of purifying the extractant permeate as required by previous hydrogen peroxide extraction methods.

The flow rates of the WS and water can be varied according to desired results and other factors. Exemplary flow rates of WS and water (extractant) are about 500 mL/min. and 100 mL/min., respectively.

Pressures can also be varied; an exemplary positive pressure of about 5 psig across the membrane surface of the WS stream side can be applied by back pressure.

The hydrogen peroxide can then be stripped from the ionic liquid using a number of means and methods known in the art including but not limited to: distillation, evaporation, and thin film evaporation.

Example III

Hydrogen Peroxide Extraction/PO Production System

More specifically one embodiment of the invention relates a system for the epoxidation of propylene to propylene oxide. Propylene oxide (PO) is reactive intermediate product used to produce a wide range of industrial and commercial products such as polyether polyols, propylene glycol, alkanolamines, glycol ethers, etc.

The extractant for use as the extraction/reaction medium for PO production from hydrogen peroxide can be a number of ionic liquids known in the art. Theoretically any IL solvent system can be used as both the extracting solvent and the reaction medium require the following properties: (1) solubility of the target species (i.e. $H_2O_2$) but not the starting solution (i.e. WS) to enable extraction from the starting solution; (2) tunable environment for enhancing catalytic activity and selectivity; (3) low volatility to enable removal of the PO product and byproducts; and (4) low overall solvent, reactant, and product loss. In the case of PO production, the ionic liquids need to have high propylene gas solubility while not inhibiting the catalysts (e.g., titanium-silica catalyst) for PO production. The ionic liquids need also to be strong hydrophilic solvent to extract the hydrogen peroxide from the hydrophobic WS. Suitable ionic liquids, which can be purchased from Merck KGaA in Germany (distributed by Sigma Aldrich or EDM in the U.S.) or synthesized in house, include, but are not limited to:

[1-Buty-3-Methyl-3H-imidazolium+][tetrafluoro borate–] ($BmIm^+$-$BF_4^-$);
[1-Buty-3-Methyl-3H-imidazolium+][trifluoro-methane-sulfonate–] ($BmIm^+$-$CF_3O_3S^-$); and
[1-Hexyl-3-methylimidazolium+][tetrafluoro-borate–] ($HmIm^+$-$BF_4^-$).

Figure 10:
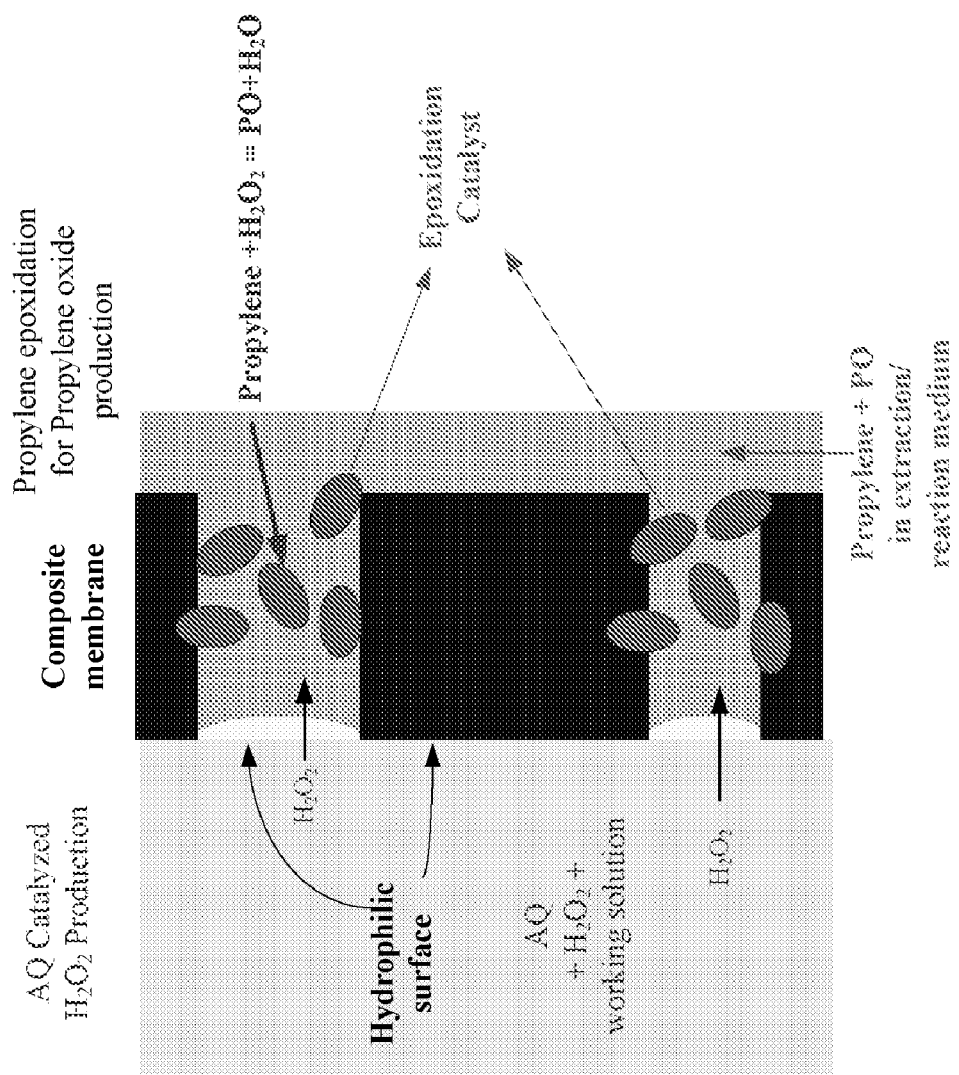
FIG. 10 is a partial cut away of a membrane contactor reactor system of the present invention employing a hydrophilic membrane with catalyst inclusions and hydrophilic ionic liquid extractant for the simultaneous separation of hydrogen peroxide and production of propylene oxide.
Figure 11:
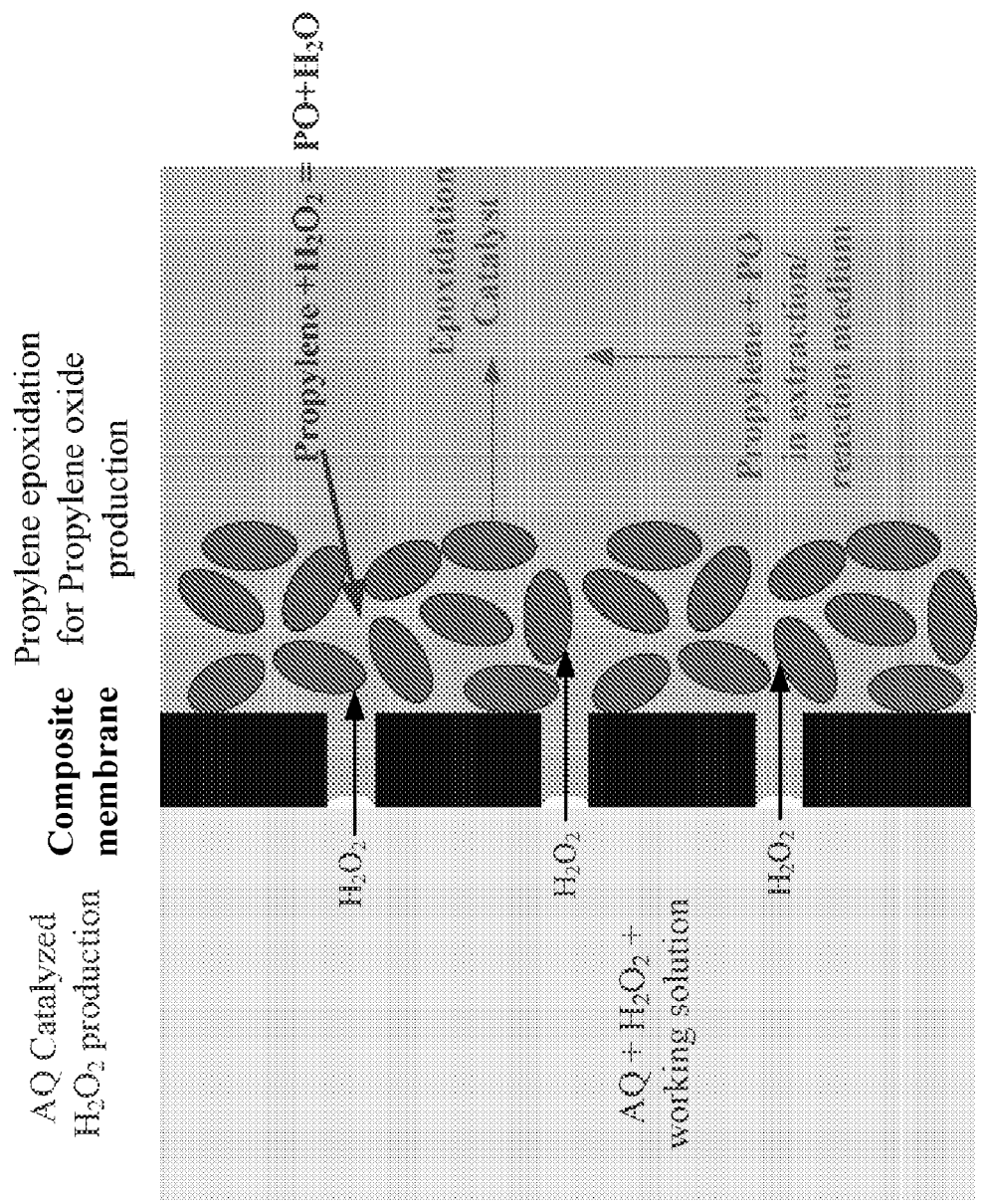
FIG. 11 is a partial cut away of a membrane contactor reactor system of the present invention employing a hydrophilic membrane with catalyst backbone and hydrophilic ionic liquid extractant for the simultaneous separation of hydrogen peroxide and production of propylene oxide.

Suitable functionalized membrane systems for hydrogen peroxide extraction/reaction to product PO are shown in FIGS. 10 and 11. Preferably the membrane incorporates an epoxidation catalyst backbone or inclusion as shown in FIGS. 10 and 11. Alternatively the catalyst can be present in the extractant.

Figure 7:
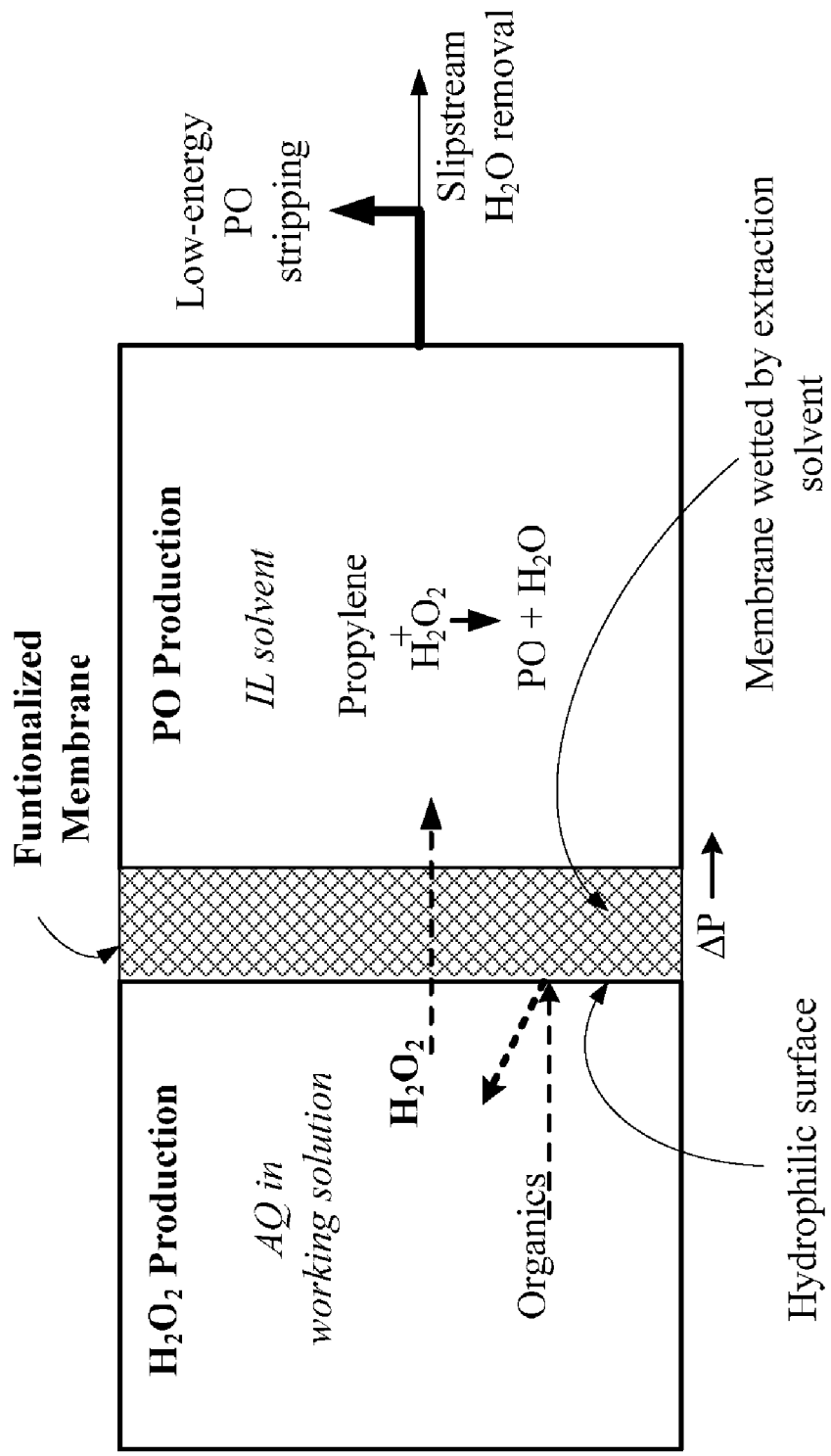
FIG. 7 is a schematic illustrating one embodiment of the present system for separation of hydrogen peroxide and concurrent propylene oxide production.

In the illustrated embodiments (FIGS. 7, 10, and 11) the dissolved hydrogen peroxide present in the starting solution permeates through the membrane into the extractant creating an extractant permeate solution (containing hydrogen peroxide). The permeated hydrogen peroxide then reacts with the propylene present in the extraction solution creating PO and water. Several suitable MCR reactors could be employed, some of which have been previously described. For example, the MCR of FIG. 2. could be utilized if the membrane was functionalized as shown in FIG. 10 or 11, and if the extraction solution contained a concentration of the reactant (i.e. propylene).

FIG. 10 illustrates one preferred membrane contactor for hydrogen peroxide separation/PO production wherein the membrane is a composite membrane having epoxidation catalyst inclusions. In this embodiment, the catalysts can be directly incorporated (by binders or direct interaction with the membrane materials) onto the surface of the pores inside the ceramic membrane.

FIG. 11 illustrates another preferred membrane contactor for hydrogen peroxide separation/PO production having an epoxidation catalyst backbone. To do this, a dual-layer of ceramic membrane can be fabricated consisting of a thin layer of fine pore size followed by a thicker layer (the backbone) of very large pore size with the insertion of titanium-silica (TS-1) catalyst based catalyst. Alternatively one could incorporate the catalyst into the extraction solution. Suitable catalysts include but are not limited to: titanium-silica (TS-1) catalyst.

As noted above, the starting solution streamed into the MCR for hydrogen peroxide separation can be any of a myriad of organic starting solutions containing dissolved hydrogen peroxide. Since most commercial methods for producing hydrogen peroxide utilize an anthraquinone (or anthraquinone derivative/analog) based starting solution, the starting solution preferably an anthraquinone based starting solution containing dissolved hydrogen peroxide.

The production of anthraquinone based starting solutions containing dissolved hydrogen peroxide are well known in the art. (See, U.S. Pat. Nos. 5,147,628; 5,071,634; 5,296,104; 6,224,845; 6,596,884 and 6,982,072, See, also Ullmann's Encyclopedia of Industrial Chemistry, $5^{th}$ ed., vol. A13 pp 447-456; all of which are hereby incorporated by reference in their entireties.

A suitable starting solution comprises: dissolved hydrogen peroxide; one or more members of the group consisting of: anthraquinone (AQ), tetrahydroanthraquinone (THAQ) and analogs and derivatives thereof; and various polar and/or non-polar solvents.

Suitable membrane contactor reactors, working solutions, extractants, flow rates, pressures and other details have been described above. The extractant and $WS_{MCR}$ can be streamed in co-current or counter current orientations. The invented method reduces or even eliminates the step of purifying the extractant permeate as required by previous hydrogen peroxide extraction methods.

The PO can then be stripped from the ionic liquid using a number of means and methods known in the art including but not limited to: distillation, evaporation, and thin film evaporation. After the PO is stripped, residual water can be stripped from the ionic liquid a using a number of means and methods known in the art including but not limited to: distillation, evaporation, and thin film evaporation.

Method for Extracting a Species from a Starting Solution

One preferred embodiment of the invented method for extracting a target species from a starting solution generally comprising the following steps:
 a. providing a membrane contactor reactor system, the membrane contactor system having a membrane with a starting solution side and an extractant side;
 b. providing an extractant, the extractant comprising: at least one ionic liquid;

c. providing a starting solution containing a concentration of a target species;
d. wetting the membrane with the extractant or starting solution;
e. streaming the starting solution along the starting solution side of the membrane contactor;
f. streaming an extraction solution along the extractant side of the membrane contactor; and
   wherein a portion of the target species is extracted from the starting solution across the membrane into the extractant forming an extractant permeate.

Wetting (or contacting) refers to how the starting solution or extractant wets or fills the pores of the membrane and developing an interface with the other solution. As noted above, either solution may wet or fill the pores depending upon the system parameters. The interface between the starting solution and extractant can be controlled by differential pressures as discussed above and as further discussed by U.S. Pat. No. 4,966,707 which is hereby incorporate by reference in its entirety.

Several membrane contactor reactors, starting solutions, extractants and other details have been described above. The extraction and starting can be streamed in co-current or counter current orientations. The invented method reduces or even eliminates the step of purifying the extractant permeate as required by previous hydrogen peroxide extraction methods.

Several membrane contactor reactors have been described above in detail including those for separating of biobased products such as ethanol, butanol, or polyols and chemical products such as hydrogen peroxide.

The target species can then be stripped from the ionic liquid using a number of means and methods known in the art including but not limited to: distillation, evaporation, thin film evaporation. After the product is removed, less volatile byproducts or impurities can be stripped from the ionic liquid using a number of means and methods known in the art including but not limited to: distillation, evaporation, thin film evaporation. In this way, the ionic liquid can be regenerated and recycled to the MCR Extraction/Reaction Method A method for the extraction and reaction of a target species from a starting solution comprising the following steps:
a. providing a membrane contactor reactor system, the membrane contactor system having a membrane with a starting solution side and an extraction solution side;
b. providing an extraction solution, wherein the extraction solution comprises: at least one ionic liquid and a reactant;
c. providing a starting solution containing a concentration of a target species;
b. wetting the membrane with the extraction solution or starting solution;
b. streaming the starting solution along the starting solution side of the membrane contactor; and
c. streaming an extraction solution along the extraction solution side of the membrane contactor;
wherein at least a portion of the target species is extracted from the starting solution across the membrane into the extraction solution forming an extraction solution permeate, wherein at least a portion of the extracted target species reacts with the reactant present in the extraction solution.

The membrane contactor reactor, reactant, starting solution, extraction solution and other details have been described above. The extraction and starting solution can be streamed in co-current or counter current orientations. The invented method reduces or even eliminates the step of purifying the extractant permeate as required by previous hydrogen peroxide extraction methods.

The resulting reaction product can be stripped from the ionic liquid using a number of means and methods known in the art including but not limited to: distillation, evaporation, and thin film evaporation.

Results

Figure 6:
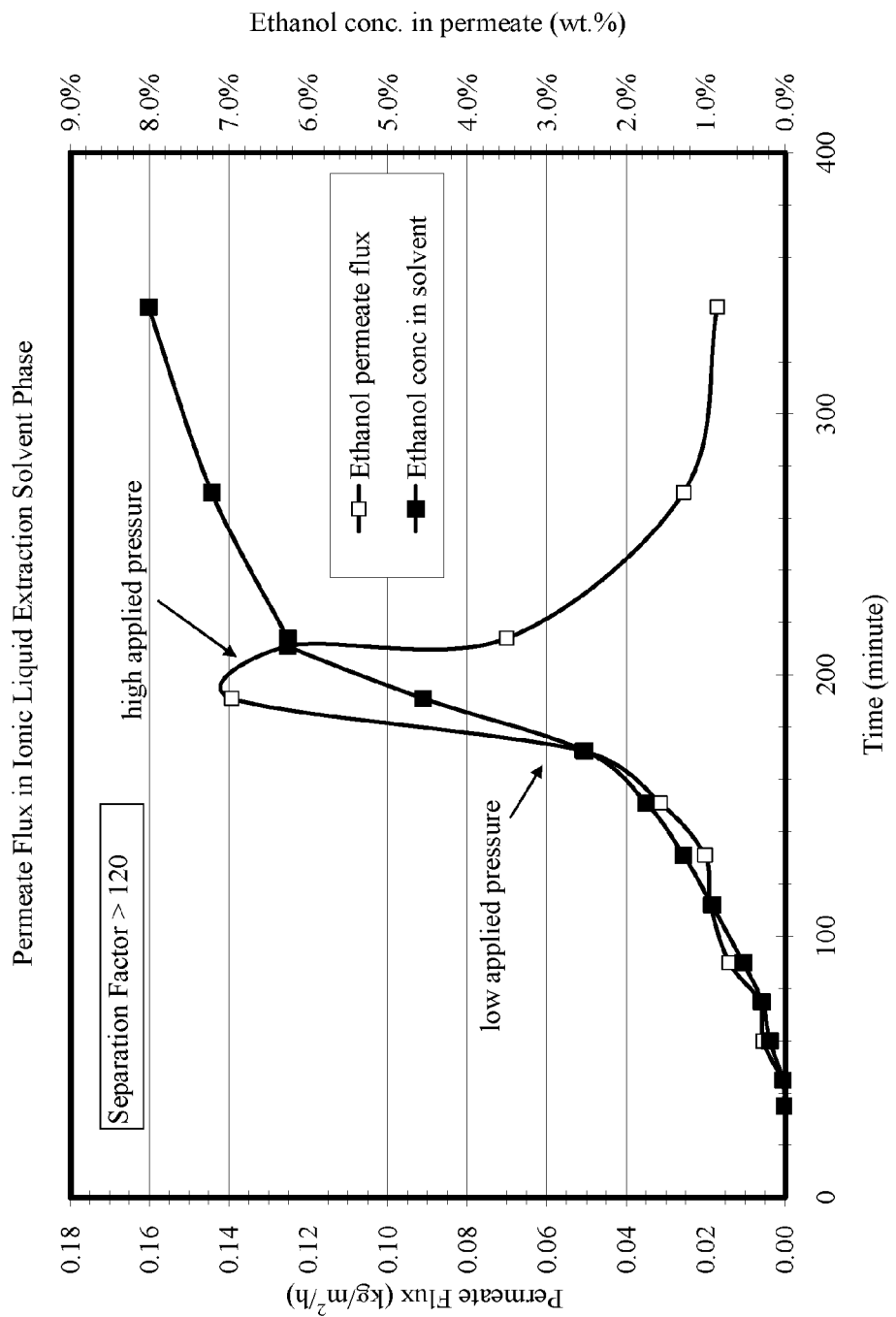
FIG. 6 is a graph of time v. ethanol concentration illustrating the ethanol flux of one embodiment of the present invention

FIG. 6 shows the results of an example of a 5 wt. % ethanol extraction from an aqueous solution using membrane contactor with the ionic liquid ([hmim][Tf2N]). The separation factor (or selectivity) of the MCR is as high as 120 or greater during the extraction. The separation factor is the ratio of ethanol vs. water partitioning between the ionic liquid extraction solution and the water (fermentation broth). A high separation factor indicates the membrane or separation process exhibits a highly preferential transport one component (e.g., ethanol) vs. the other components (e.g., water).

These results reveal the value of the invented system because the separation factor for the MCR is 20%-30% higher than the separation factor for a direct contact liquid-liquid extraction for a 5% aqueous ethanol solution using the identical ionic liquid. Thus the invented system is highly advantageous as it outperforms prior liquid-liquid extraction systems while also reducing or even eliminating cross-contamination between the starting solution and extractant.

The separation factor of 120 for ethanol extraction using the MCR with ILs is also vastly superior to other membrane based separations such as pervaporation, which have been reported to have separation factors ~10-15 for ethanol separation from water. While pervaporation overcomes some of the problems associated with liquid-liquid extractions, it is not nearly as effective as the present invention in separating target species from a starting solution.

The invented system's superior performance is believed to be a result of a synergistic effect between the functionalized membrane contactor and ionic liquid extractant.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which can be subsequently broken down into sub-ranges as discussed above. Accordingly, the invention is limited only by the following claims and equivalents thereto. The invention can be applied and adapted to presently known and future developed methods and systems.

All publications and patent documents cited in this application are incorporated by reference in their entirety for all purposes to the same extent as if each individual publication or patent document were so individually denoted.

What is claimed is:

1. A method for separating a target species from a starting solution using membrane contactor assisted extraction comprising the following steps:
   a. providing a liquid-liquid membrane contactor reactor system, the membrane contactor system having a porous membrane contactor with a starting solution side and an extraction solution side;
   b. providing an extraction solution comprising at least one ionic liquid;
   c. providing a starting solution;
   d. wetting the membrane contactor with the extraction solution or starting solution, wherein a liquid-liquid interface (contact) is established between the extraction solution and starting solution in the membrane pores;
   e. streaming the starting solution containing a concentration of a target species along the starting solution side of the membrane contactor; and
   f. streaming an extraction solution along the extraction solution side of the membrane contactor; and
   wherein at least a portion of the target species is extracted from the starting solution across the membrane into the extraction solution forming an extraction solution permeate.

2. The method of claim 1, further comprising the step of recovering at least a portion the extraction solution permeate.

3. The method of claim 1, further comprising the step of stripping the target species from the extraction solution permeate.

4. The method of claim 1, further comprising the step of: creating and maintaining a pressure gradient between the starting solution and extraction solution sides of the membrane contactor.

5. The method of claim 1, wherein the starting solution comprises: water and at least one member selected from the group consisting of: alcohols and polyols, wherein the membrane is contactor is hydrophobic, and wherein the ionic liquid is hydrophobic.

6. The method of claim 1, wherein the starting solution comprises: ethanol and water.

7. The method of claim 1, wherein the starting solution comprises: butanol and water.

8. The method of claim 1, wherein the extraction solution further comprises at least one reaction compound and wherein at least a portion of the target species is extracted from the starting solution across the membrane into the extraction solution forming an extraction solution permeate, wherein at least a portion of the extracted target species reacts with the reaction compound present in the extraction solution forming a reaction product.

9. The method of claim 8, wherein the starting solution comprises dissolved hydrogen peroxide and at least one organic solvent.

10. The method of claim 8, further comprising the step of stripping the reaction product from the extraction solution permeate.

11. The method of claim 9, wherein the reaction compound is propylene.

12. The method of claim 4, wherein the pressure gradient is less than the breakthrough pressure.

13. The method of claim 1, wherein the starting solution comprises: water and between about 0.5 to 15 wt. % ethanol.

14. The method of claim 13, wherein the ionic liquid is hydrophobic and wherein the membrane contactor is hydrophobic.

15. The method of claim 13, wherein the ionic liquid is selected from the group consisting of -Butyl-1-methylpyrrolidinium bis(trifluoromethylsulfonyl)imide ([bmpyr][Tf2N]) ($C_{11}H_{20}F_6N_2O_4S_2$), 1-hexyl-3-methylimidazolium bis(trifluoromethyl)sulfonylimide ([hmim][Tf2N]) ($C_{12}H_{19}F_6N_3O_4S_2$), and combinations thereof.

16. The method of claim 9, wherein the ionic liquid is hydrophilic and the membrane contactor is hydrophilic.

17. The method of claim 16, wherein the ionic liquid is selected from the group consisting of [1-Buty-3-Methyl-3H-imidazolium+][tetrafluoro borate−] ($BmIm^+$-$BF_4^-$), [1-Buty-3-Methyl-3H-imidazolium+][trifluoro-methanesulfonate−] ($BmIm^+$-$CF_3O_3S^-$), [1-Hexyl-3-methylimidazolium+] ($HmIm^+$-$BF_4^-$]), and combinations thereof.

* * * * *